(12) United States Patent
Bahr et al.

(10) Patent No.: US 12,049,708 B2
(45) Date of Patent: Jul. 30, 2024

(54) ADHESIVE JOINING DEVICE AND ADHESIVE JOINING METHOD FOR A METAL SURFACE

(71) Applicant: nascit GmbH, Kiel (DE)

(72) Inventors: Joerg Bahr, Altenholz OT Klausdorf (DE); Melike Baytekin-Gerngross, Reutlingen (DE); Mark-Daniel Gerngross, Reutlingen (DE); Juergen Carstensen, Kiel (DE); Rainer Adelung, Kiel (DE); Ingo Paulowicz, Kiel (DE)

(73) Assignee: nascit GmbH, Kiel (DE)

( * ) Notice: Subject to any disclaimer, the term of this patent is extended or adjusted under 35 U.S.C. 154(b) by 768 days.

(21) Appl. No.: 17/048,607

(22) PCT Filed: Apr. 17, 2019

(86) PCT No.: PCT/DE2019/100357
§ 371 (c)(1),
(2) Date: Oct. 19, 2020

(87) PCT Pub. No.: WO2019/201395
PCT Pub. Date: Oct. 24, 2019

(65) Prior Publication Data
US 2021/0148002 A1    May 20, 2021

(30) Foreign Application Priority Data
Apr. 20, 2018   (DE) ................. 10 2018 109 531.7

(51) Int. Cl.
*C25F 3/14*   (2006.01)
*C25F 7/00*   (2006.01)
*F16B 5/08*   (2006.01)

(52) U.S. Cl.
CPC ............. *C25F 3/14* (2013.01); *C25F 7/00* (2013.01); *F16B 5/08* (2013.01)

(58) Field of Classification Search
CPC .............. C25F 3/14; C25F 7/00; B23H 9/008
See application file for complete search history.

(56) References Cited

U.S. PATENT DOCUMENTS

| 3,546,088 A | 12/1970 | Barkman et al. |
|---|---|---|
| 4,428,815 A | 1/1984 | Powell et al. |
| (Continued) | | |

FOREIGN PATENT DOCUMENTS

| DE | 69402952 T2 | 11/1997 |
|---|---|---|
| DE | 600324525 T2 | 4/2007 |
| (Continued) | | |

OTHER PUBLICATIONS

International Search Report dated Jul. 30, 2019, in International Application No. PCT/DE2019/100357.

*Primary Examiner* — Nicholas A Smith
(74) *Attorney, Agent, or Firm* — Stephan A. Pendorf; Patent Central LLC

(57) ABSTRACT

An adhesive joining device for providing a connection between a metal surface and a body using an electrochemical etching device. The device has a vacuum holder to form a vacuum connection between the adhesive joining device and the metal surface. A tool changing holder receives at least two different tools in a time-staggered manner. A first tool can be an electrochemical etching cell for an electrolyte with an etching chamber which is oriented towards the metal surface, a feed for electrolyte, a drain, and two electrodes, one electrode being mechanically and electrically connected to the metal surface and the second electrode coming into contact with the electrolyte. A second tool is for holding and positioning the body to be adhered to the etched metal surface. The distance, position, alignment, and/or parallelity (Continued)

of the body to be adhered can be configured in a reliable and defined manner for the adhesion process.

10 Claims, 9 Drawing Sheets

(56) References Cited

U.S. PATENT DOCUMENTS

| | | | |
|---|---|---|---|
| 4,810,343 A | | 3/1989 | Bonnardel |
| 4,986,889 A | | 1/1991 | Charamathieu et al. |
| 5,571,389 A | * | 11/1996 | Kerampran ............ C25D 5/026 |
| | | | 204/278 |
| 6,569,282 B1 | * | 5/2003 | Arisa ................ H01L 21/67207 |
| | | | 156/345.31 |
| 8,974,656 B2 | * | 3/2015 | Trimmer ................ B23H 9/008 |
| | | | 205/658 |
| 2013/0327353 A1 | * | 12/2013 | Field ........................ B08B 7/00 |
| | | | 134/1 |
| 2018/0087170 A1 | * | 3/2018 | Kawamura ............... C25F 3/14 |

FOREIGN PATENT DOCUMENTS

| DE | 102016113641 A1 | 1/2018 |
|---|---|---|
| EP | 3140438 A1 | 3/2017 |

\* cited by examiner

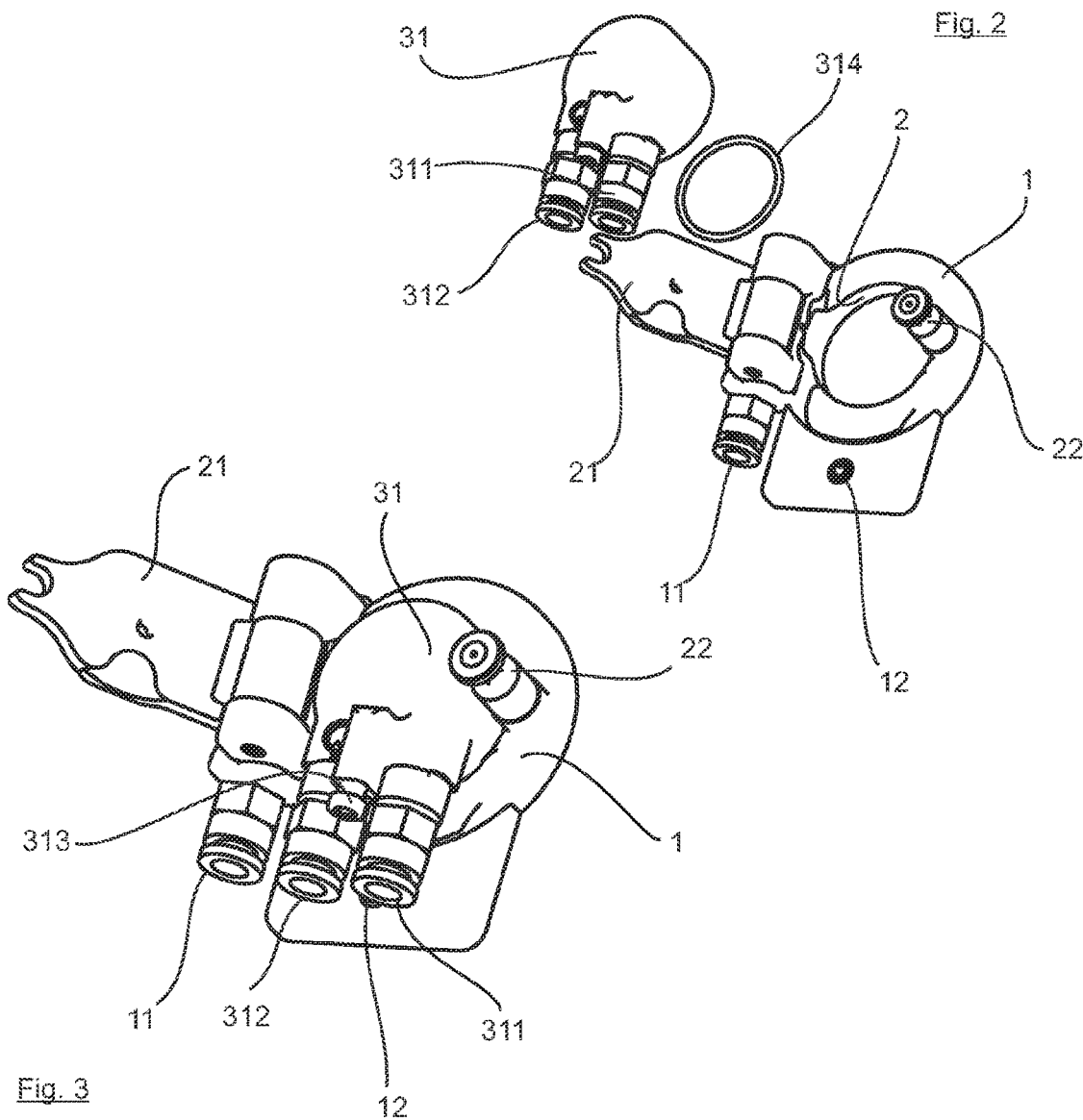
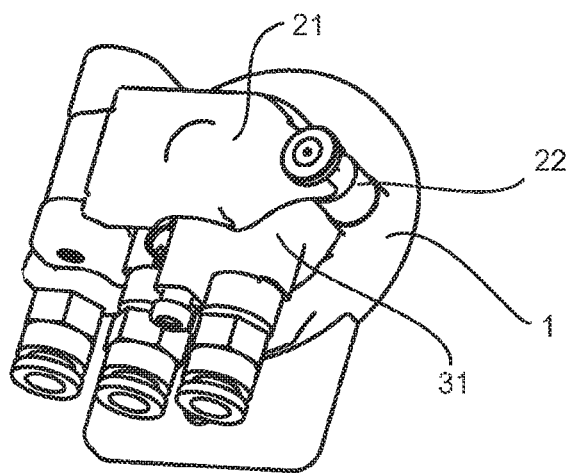

Fig. 13
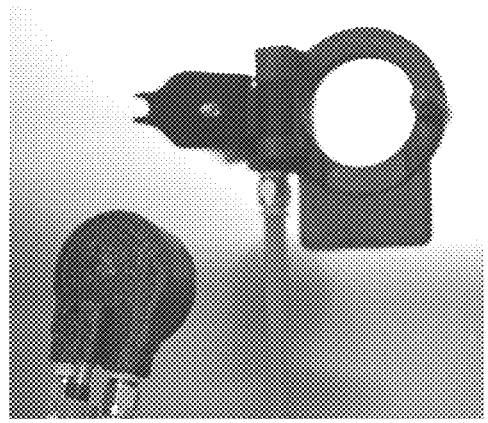
Fig. 14
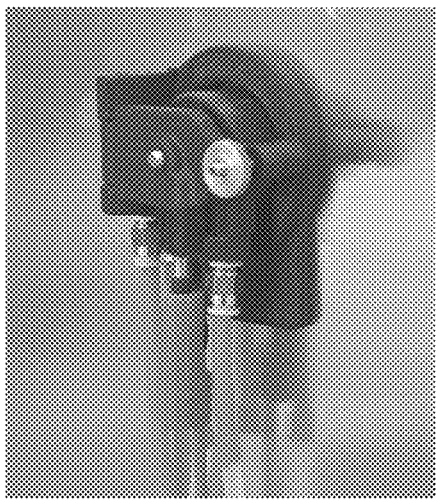
Fig. 15
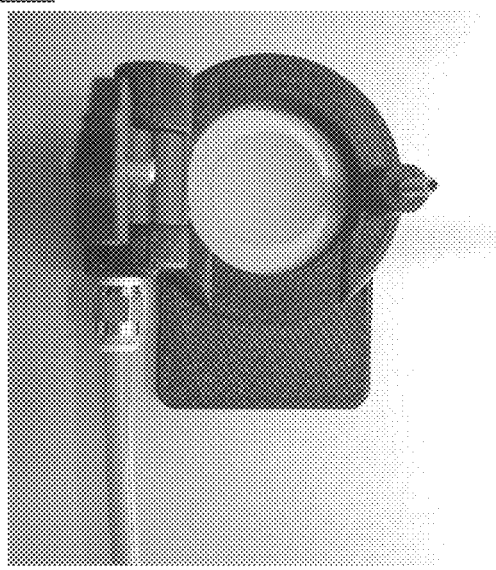
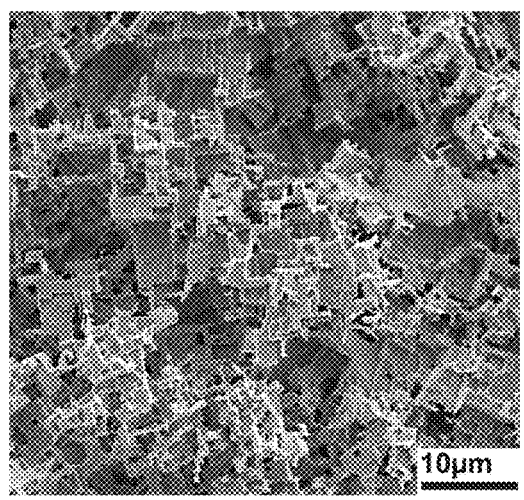
Fig. 16
Fig. 17
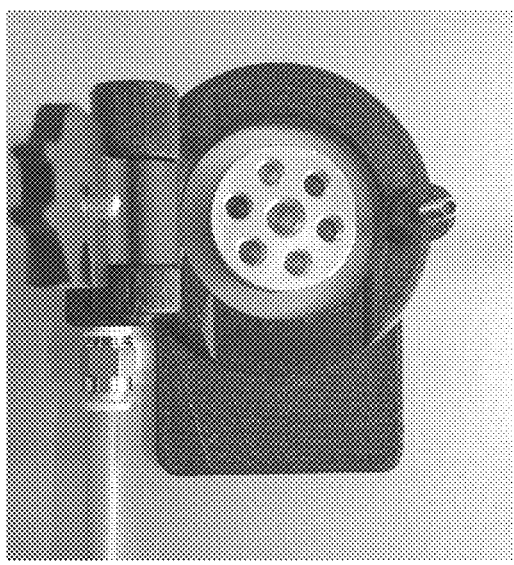
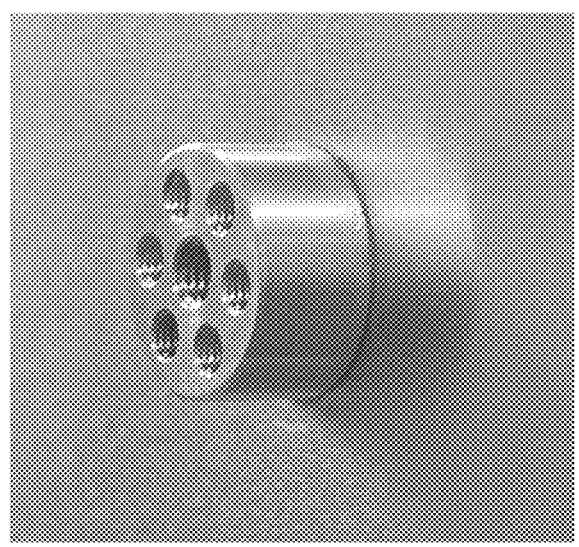
Fig. 18

Fig. 26
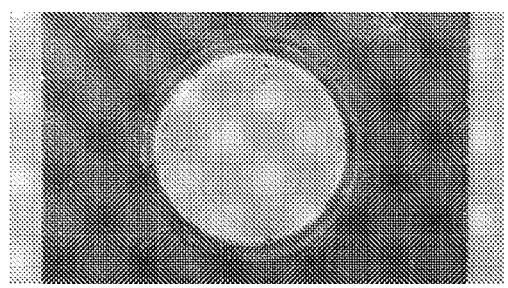
Fig. 27
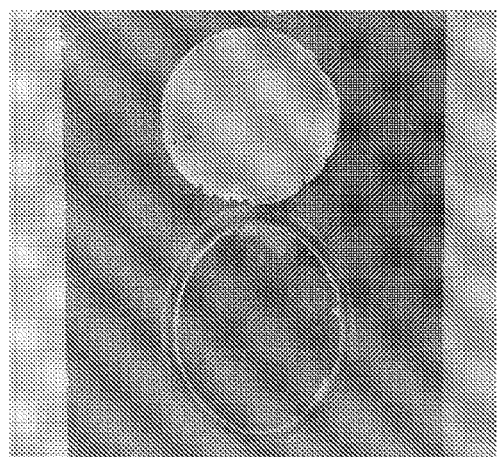
Fig. 28
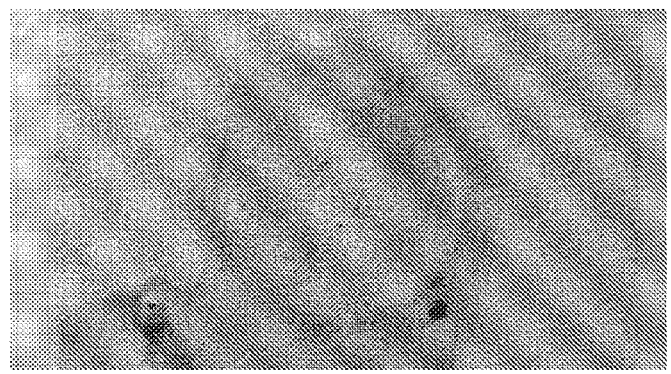
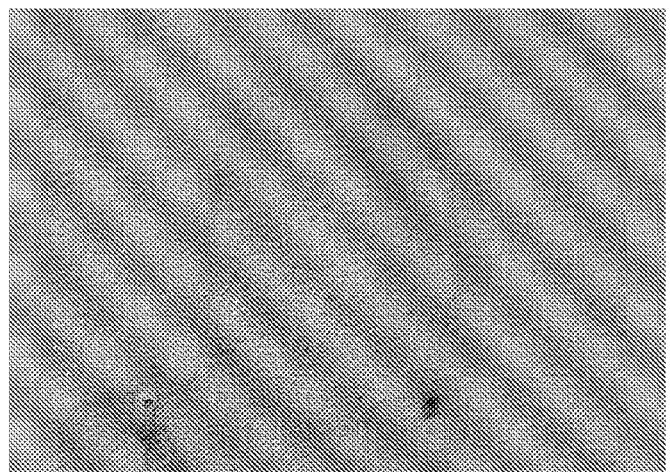
Fig. 29

ADHESIVE JOINING DEVICE AND ADHESIVE JOINING METHOD FOR A METAL SURFACE

BACKGROUND OF THE INVENTION

Field of the Invention

The invention relates to an adhesive joining device for preparing and/or producing an adhesive connection at an adhesive point and/or adhesive section on a metallic surface with a body and/or component to be adhered thereon and an adhesive by means of an electrochemical etching device.

The invention also relates to an adhesive-joining method for a metallic surface with an adhesive-joining device designed according to the invention for preparing and/or producing an adhesive connection at an adhesive point and/or adhesive section on a metallic surface with a body and/or component to be adhered thereon and an adhesive.

The technical field of the invention relates to joining by means of adhesive techniques and the preparation and/or production of corresponding adhesive connections, particularly, but not exclusively, in the field of the manufacture of ships, aircraft, vehicles, as well as special machines or supporting structures.

Description of the Related Art

From the state of the art different joining techniques are known for joining two components or structures, including, but not limited to, welding, soldering, screwing and/or riveting, all of which being widely employed and highly developed. Nevertheless, these joining techniques can not optimally be used in various applications. For example, heat input during welding or soldering for joining can be too high for structures or coatings, in particular components, so that materials or the environment, as well as already applied coatings and the like, can be damaged. Screws and rivets require holes which, for example, are not allowed in many metallic outer walls.

In particular, in addition to the classic joining methods, there is the possibility of adhering in order to connect two components or sections or workpieces to one another, wherein the adhesive techniques known in the prior art are often not strong enough or not predictable enough, due to deficiency in the adhesive, to also reliably utilize them in component- or total-object planning, for example for vehicles or aircraft, as well as in shipbuilding and structural engineering.

The problem identified above has, however, already been successfully solved through so-called "nanoscale sculpturing" on various metal surfaces such as zinc according to EP 3 140 438 A1 (see below), Al/Al alloys according to DE 10 2016 113 641 A1 (see below) by electrochemically providing the metal surface with a mechanical barb structure so that polymers can be coupled to the structured metal surface in a purely mechanical manner, whereby failure is only possible cohesively, i.e. either in the polymer or the metal, depending on the mechanical strength, and thus is clearly determined by the size of the adhesive surface, the thickness of the adhesive layer and the mechanical tensile and shear strength of the polymer or ceramic adhesive. Structural bonds of this kind can therefore be calculated very well and can therefore also be used for relevant structural connections, for example in vehicle construction. Reference is expressly made to the aforementioned publications and their content is incorporated herein by reference.

Document EP 3 140 438 A1 discloses a galvanized workpiece which has polycrystalline zinc with grain sizes larger than 20 micrometers at least on parts of the workpiece surface, this being characterized by irregularly distributed conical pores with different diameters penetrating the zinc grain walls. Furthermore, a method for producing a corresponding galvanized workpiece is also shown, characterized in that the galvanized workpiece surface is electrochemically etched in an aqueous electrolyte containing potassium chloride at a predetermined temperature with the application of a periodic square-wave voltage.

A heterostructure is known from document DE 10 2016 113 641 A1, which comprises at least a first partial surface solely comprising copper and at least a second partial surface opposite the first partial surface comprising only aluminum or an aluminum alloy, with an anchoring layer arranged between the first and the first second partial surface, each cut surface running perpendicular to the anchoring layer having at least one island of aluminum or aluminum alloy enclosed by copper and at most the previously existing mixed crystals of the aluminum alloy occurring in the anchoring layer. The invention also relates to an aluminum-copper connector and a heterostructure manufacturing method.

Furthermore, different arrangements are known in the prior art, by means of which appropriate etchings can be made to prepare a surface. Here, the piece to be processed, or rather the processing point and later adhesion point, is often referred to as a spot.

Document U.S. Pat. No. 3,546,088 A deals with the problem of carrying out etching on very large areas, these large areas not fitting into an electrolyte tank, which is particularly not possible with aircraft or spacecraft components made of aluminum that are to be anodized for corrosion protection. For this purpose, it is proposed to use a device which is intended to remain movably displaceable over large areas, with a corresponding electrolyte also being able to escape laterally during processing.

Document U.S. Pat. No. 4,810,343 A discloses a device for carrying out a localized electrolytic surface treatment, which has an electrolyte container with an electrolyte reservoir and a pump device, which can supply the electrolyte to an anodic device which can be brought into contact with the surface of the workpiece to be treated, the device then being connected between the surface of the anode and the surface to be treated, the anode and the workpiece with the terminals of a DC voltage source, wherein this is connected to suction means for returning the electrolyte to the container, after passing the electric flow zone.

Document U.S. Pat. No. 4,986,889 A discloses an electrolytic treatment suction device located in connection with a surface to be treated, this having a cavity which is divided by an electrode into an electrolyte flow chamber, an inlet chamber and a suction chamber, the inlet and suction chambers subordinated in a distribution chamber, which are connected to a pipe connection and a flow compensation chamber with a channel. Here a single tool is disclosed, which according to the invention after the use, namely the electrochemical machining of a machining point, also called a spot, can no longer be used.

The problem with the prior art is that there are no compact adhering and joining devices that enable or allow joining in any desired orientation, i.e. also on inclined surfaces and, for example, also overhead adhering. In particular, an appropriate surface treatment, namely etching of a metallic surface and precise application of a substrate at this point, in particular an adhesive, is not possible, especially in hardto-reach areas, for example in a vehicle, ship or aircraft during its production or repair or maintenance.

The present invention has the objective of producing high-strength adhesive connections on metallic surfaces, which replace the previous joining options for junction, structural and/or spatial reasons as well as aesthetic and/or mechanical reasons.

In particular, it should be possible to electrochemically structure a locally limited section, processing adhesive point, hereinafter also referred to as a spot, of the metal surface according to the "nanoscale sculpturing" method outlined above and subsequently the positioning of an adhesive body should be precisely definable, whereby this positioning can be seen laterally, i.e. in the tilting and at a distance from the metal surface, or, alternatively, an electrochemical deposition of metals such as copper or the like can be carried out on the previously etched surface, with necessary intermediate steps such as cleaning and drying also being feasible locally.

In particular, it should be possible to carry out preparatory measures locally and in any position so that bonding can take place in any component position.

Appropriate devices and methods are to be demonstrated for this purpose.

BRIEF SUMMARY OF THE INVENTION

This object or objects is/are achieved with an adhesive-joining device according to the main claim and an adhesive-joining method according to the independent claim and partly also by means of the further advantageous optional configurations according to the dependent claims.

The adhesive joining device for producing an adhesive connection in an adhesive point and/or adhesive section on a metallic surface with a body and/or component to be adhered thereon and an adhesive by means of an electrochemical etching device comprises a vacuum holder with a vacuum connection, wherein a vacuum can be formed between the adhesive joining device and the surface around the adhesive point and/or adhesive section to be produced, and furthermore comprises a tool changing holder adapted to receive at least two different tools in a time-offset manner and in a defined position, comprising a first usable tool which can be inserted into the tool holder and used in a time-offset manner, namely an electrochemical etching cell for an electrolyte with an etching chamber which is oriented towards the metal surface, a feed for supplying an electrolyte to the etching chamber, a drain for the etching chamber, and two electrodes with corresponding electric contacts, one electrode being mechanically and electrically connected to the metal surface to be structured and the second electrode only coming into contact with the electrolyte acting quasi as a counter-electrode, and further comprising a second tool which can be inserted into the tool holder and used in a time-offset manner for holding and positioning the body and/or component to be adhered to the etched metal surface with a defined position within the tool holder, wherein the distance, position, alignment, and/or parallelism of the body to be adhered can be configured in a reliable and defined manner for the adhesion process.

This configuration allows electrochemical preparation of a metallic surface in any position or attitude, namely orientation of the metallic surface to be prepared, since the vacuum holder is suctioned onto the surface by means of a vacuum pump, creating a temporary holder for the at least two tools. The at least two tools can then be introduced one after the other into the tool holder of the device according to the invention and thus carry out the adhesive method according to the invention independently of the positional orientation of the surface.

The vacuum or negative pressure presses and firmly holds in place the vacuum holder for the etching and subsequent cleaning as well as for the positioning of the adhesive or adhesive body, with the vacuum ensuring quick and safe attachment and removal of the vacuum holder.

The further special feature of the design of the vacuum holder is, in a particularly preferred embodiment, that the means for vacuum suction are completely embodied in a surrounding sleeve, i.e. not in the metallic surface to be processed for the bonding, so that it frames the area of the metallic surface to be processed. The tool holder is also particularly preferably located in the center of the vacuum holder, that is to say, practically in the sleeve.

The etching cell, i.e. the first tool, can be quickly and safely mounted and dismantled on the tool holder with the vacuum holder, with the tool holder of the vacuum holder guiding the etching cell and repositioning it again and again so that the etching cell is positioned over the surface to be etched and the etching cell is pressed electrolyte-tight.

In a particularly preferred embodiment, in particular, a corresponding locking mechanism or detent/stop/block is provided for the tools, so that they always have the same spacing or positioning and there are therefore no tolerances to be taken into account, for example for the adhesive gap.

In addition, the tool holder, together with the vacuum holder, guides the body to be adhered and can thus position and set it down over the etched surface, whereupon a second tool presses the adhesive body on and does not completely push the adhesive away, but rather positions it at a defined distance, i.e. with the adhesive body to be adhered having a predetermined adhesive gap until the adhesive has hardened.

Possible adhesives, this list intended to be exemplary only and not limiting, include acrylate, polyurethane, epoxy adhesives and adhesives based on ethylene vinyl acetate, silicone, and, for temperature-critical applications, ceramic based adhesives.

In automobile production, for example, such adhesive joining devices can be designed with a special surface-adapted geometry, so that although a respective adhesive joining device must be kept available individually, the cost is quickly amortized over a large number of workpieces, so that defined bonds can be carried out for the same vehicle models, whereby these can be calculated exactly and can therefore also be statically calculated.

Correspondingly large-area bonds can also be carried out with appropriately designed tools, so that, for example, longer components made of CFRP and GFRP can be bonded to aluminum components in the aircraft industry. Corresponding etching cells can be placed and positioned on the aluminum with the vacuum holder for this purpose, and after the structured metallic surface treatment, with an appropriate second tool, which is also guided on the vacuum holder in a corresponding tool holder, a corresponding CFRP or GFRP component with an adhesive can be appropriately positioned and fixed for curing so that defined adhesive gaps can also be implemented here, so that these bonds can also be calculated and used statically.

The holding force due to the vacuum enables the electrolyte to be introduced into the etching chamber even with positive pressure, thus realizing an active flow of the electrolyte onto the surface.

Furthermore, of course, horizontal surfaces can also be processed with negative pressure by means of the electrolyte, simply by the action of gravity, so that good contact of the electrolyte to the surface to be treated is ensured.

In a preferred embodiment, the at least first tool is fluid technically adapted to the metallic surface to be etched in terms of curvature and/or expansion. This makes it possible to treat complex surfaces both in terms of their geometry and their extent with only one first tool, namely a correspondingly adapted etching cell, ensuring that the electrolyte reaches the entire surface to be processed and comes into contact with it. For this purpose, for example, channels can be provided in the etching cell, which guide the electrolyte over the surface in such a way that it is etched homogeneously.

The first tool that can be inserted in the tool holder and used with a time delay can also be used for cleaning the etched metallic surface, and provided with corresponding supply and discharge lines for cleaning and/or rinsing liquids and/or rinsing medium and/or the existing supply and discharge lines can be can be switched over for a cleaning and/or rinsing liquid and/or rinsing medium. It is therefore possible to carry out cleaning or rinsing with the same tool head immediately after the etching process, since the same connections can be used for a rinsing medium, so that the corresponding electrolyte and etching residues can be removed. Alternatively, a third time delayed tool that can be inserted and used in the tool holder can also be provided for cleaning the etched metallic surface after the etching process.

Furthermore, a fourth tool, which can be inserted in the tool holder and used with time delay, can be provided for the local deposition of copper on structured aluminum surfaces in order to produce at least one electrical contact point. It should be noted that, according to the invention, the embodiment of a yet further invention can also be such that the corresponding vacuum holder is designed with two tool holders, this being designed to accommodate two different tools that can be used one after the other with a time offset, the first tool being the described etching cell the second tool being quasi the fourth tool of the invention actually described here, namely a deposition device for the deposition of copper on the correspondingly surface-treated aluminum. This makes it possible to set up defined electrical contact points made of copper on an aluminum surface in such a way that a corresponding connection is established between the copper and the aluminum with a corresponding surface treatment, in particular according to the nanoscale sculpturing process. It is expressly emphasized at this point that a corresponding surface treatment with subsequent copper deposition is viewed as an independent invention, the features being the same, however the production of an adhesive connection is not necessary. This is also explained in greater detail below.

In a preferred alternative embodiment, there can be provided at least one vacuum pump, which is line-connected to the vacuum chamber via the vacuum connection, and/or at least one electrolyte supply for storing an electrolyte and/or at least one electrolyte collecting container for receiving the used electrolyte and/or at least one electrolyte supplying pump for supplying electrolytes to the first tool and/or at least one pump for supplying rinsing medium to the first and/or the third tool and/or at least one control unit for device control and/or process control. In particular, in a particularly preferred embodiment, all of the aforementioned features are combined.

In addition, the adhesive and/or joining device can be designed to be mobile and/or transportable, so that mobile and flexible use is enabled, this particularly allowing on-site use for repair teams, for example in aviation, as well as for installation teams for special machine designs.

Of course, the vacuum holder can be activated or deactivated in terms of vacuum technology using an operating button or other triggering device that can be provided accordingly, so that a correspondingly provided vacuum pump enables the necessary attachment by suction. This pressing-against also enables the electrochemical etching cell to be pressed onto the metallic surface for etching, so that no electrolyte or rinsing agent can run out and thus adjacent surfaces or surfaces painted on the backside are not damaged.

After an initial adhering or gluing, the vacuum holder can simply be removed and relocated so that a second adhering or gluing is possible. In this regard, a configuration with a central control unit and several adhesive joining devices is of course also possible, so that several points can be processed accordingly at the same time. The one central control device can then accordingly supply and control the adhesive-joining devices connected there.

The vacuum holder can also be designed in such a way that the vacuum holder heats the adhesive body to be bonded and/or the base material or the adhesive for faster or more defined bonding.

In a further embodiment, the vacuum holder can serve as a guide for grinding or sandblasting tools in order to clean the metallic surface to be structured from dirt or paint residues that could impair the electrochemical etching.

In particular, it has been found that the etched metallic surface is more pure in its electrochemical potential than the untreated base material.

It is also possible to create adhesive-joint connections according to the invention which have or even exceed the strength of weld seams on metals which are actually not weldable or should not be welded due to strong effects on the mechanical strength.

The device also enables spatially limited, etched metallic surfaces on which high-strength adhesive connections are possible, the strength of which is comparable to welded connections.

In contrast to welding, the new adhesive and joining technology does not introduce any heat, which means that changes in the structure in the area of the adhesive surfaces are almost completely avoided.

In contrast to other adhesive bonds, a high-strength adhesive bond is created that is ultimately only determined by the mechanical properties of the adhesive and not any longer by the adhesive properties at the adhesive/metal base surface.

Adhesive joints are possible in very narrow and difficult-to-access installation positions, since the small size of the electrochemical cell in a preferred embodiment enables free positioning that has considerably more degrees of freedom than with comparable welded parts.

For the practicability of this device, the method can be implemented in a system that has a small structural shape that is mobile and also easy to assemble and disassemble. In addition, the positioning, etching, cleaning and subsequent bonding can be carried out in times similar to those normally required for the joining techniques to be replaced.

According to the invention, the adhesive-joining method for a metallic surface with an adhesive-joining device has the following steps, selecting the adhesive location and positioning and securing the adhesive-joining device by means of the vacuum holder by creating and maintaining a vacuum, simultaneously or subsequently inserting the first tool into the tool holder, creating a structure on the metallic surface at the defined position and area by electrochemical etching using the first tool, cleaning and drying of the structured metallic surface with the aid of the first tool or a third tool, wherein a tool change takes place when the third tool is used, removing the tool from the tool holder, producing a bond by inserting the second tool into the tool holder and positioning the body and/or component to be bonded in the second tool and applying the adhesive on the structured metallic surface and/or the body and/or component and then applying the body and/or component to be adhered by means of the second tool to produce a defined gap width, alignment to the structured metallic surface in a stationary position directly above the previously structured metallic surface, whereby the tool holder and the vacuum holder remain stationary, or positioning the body and/or component to be adhered and the adhesive on the structured metallic surface and then inserting the second tool into the tool holder and using the second tool to produce a defined gap width, alignment the structured metallic surface in a stationary position directly above the previously structured metallic surface, the tool holder with the vacuum holder remaining stationary, hardening and/or allowing the adhesive to harden, removing the adhesive joining device.

The method described makes it possible to electrochemically etch structures in a locally limited section of a metallic surface and then to carry out a corresponding positioning of a body or component to be bonded in a defined orientation and at a predetermined distance from the metallic surface, so that the body or the component to be adhered can be adhered in a predetermined manner on a metallic surface, and so an optimal adhered connection can be achieved, which can also be calculated.

What is special about the method is the fixed work at a defined point, so that exactly as much surface is structured/electrochemically etched as is necessary for the actually required adhesive surface. In addition, it is no longer necessary to reposition or relocate any tools, since only tools have to be exchanged via the tool holder and/or vacuum holder and/or tool holder, which are positioned in a defined manner, and these can be easily positioned in the corresponding tool holders.

In a preferred embodiment of the adhesive and joining device, the etching can be carried out by means of nanoscale sculpturing. The nanoscale sculpturing process has already been briefly explained at the beginning, with reference to the state of the art in this regard. However, tests have already shown that corresponding surface texturing in combination with the method claimed herein lead to extremely durable adhesive connections. The nanoscale sculpturing process can also be used for different metals.

Furthermore, in one embodiment of the method, the adhesive can be applied by means of an adhesive application aid and/or the adhesive can be hardened under defined conditions such that a defined amount of heat and/or a defined temperature is supplied and/or UV radiation or other typical procedures so that curing is accelerated.

At this point it should be noted that the rinsed surface can be dried, wherein rinsing can be carried out for example with water, by puffing or blowing dry.

It should be mentioned at this point that the vacuum holder needs sufficient holding force to hold itself, the tools and in particular the etching cell, namely the first tool, in any selected position when exposed to fluid pressure, so that falling off from the surface is prevented even on vertical walls or when used overhead.

In a further embodiment, the vacuum holder could be designed in particular flat, with multi-zone vacuum areas also being possible, so that additional backup zones could also be implemented.

The advantages are summarized again below:
small design, mobile, easy and safe to assemble and dismantle;
time expenditure for the adhesive-joining method according to the invention similar to the joining method known in the prior art being replaced;
the created adhesive connection is calculable and also has similar or greater strength values than a welded connection;
adhered or glued connections of this type can often also be carried out in inaccessible places, where otherwise a welded connection would not allow the use of a welding device due to the lack of space;
there is no heat input, in particular no heat input that could change the base material or an existing coat of paint;
there are no unsightly seams and no holes are introduced into the base material;
in addition, joints on thin sheets are possible, these having significantly higher strengths;
components that have already been completed, such as a ship's wall, pipelines or carriers, can subsequently be fitted with corresponding bodies and/or components to be adhered on in the simplest way by means of the high-strength adhesive-joining method according to the invention;
almost any installation position can be realized;
the adhesive to be applied, which is an initially flowable and then hardenable material, is designed to have an adjustable or a pre-defined uniform viscosity;
metallic bodies with incorporated threads can be used as bodies and/or components to be adhered, so that these metallic bodies with the introduced threads are adhered onto the existing metallic surface;
in particular, the device or the method can be used with particular preference on massive metallic components which are generally difficult to move.

BRIEF DESCRIPTION OF THE SEVERAL VIEWS OF THE DRAWINGS

In the following, exemplary embodiments of the invention are described in detail with reference to the accompanying drawings in the description of the figures, whereby these are intended to explain the invention and are not to be regarded as limiting:

Therein:

FIG. 2 shows a schematic representation of an exemplary embodiment of the vacuum holder 1 with a first tool 31 not yet inserted;

FIG. 3 shows a schematic representation of the exemplary embodiment of the vacuum holder 1 shown in FIG. 2 with the first tool 31 inserted, this only being positioned but not yet fixed;

FIG. 4 shows a schematic representation of the exemplary embodiment of the vacuum holder 1 shown in FIGS. 2 and 3 with the first tool 31 inserted and fixed;

FIG. 7 shows a schematic representation of the exemplary embodiment of the vacuum holder 1 shown in FIGS. 5 and 6 with the inserted and locked second tool 32 and the exemplarily executed, positioned body 4 to be adhered on;

Furthermore, FIGS. 1 to 5 show the device according to the invention using an aluminum surface on which a workpiece is to be adhered. There is shown:

FIG. 13: vacuum-assisted tool holder before the etching cell is placed (first tool) for electrochemical processing of an aluminum surface chosen as an example;

FIG. 14: vacuum-assisted tool holder with attached and fixed etching cell (first tool) during the electrochemical process of the aluminum surface;

FIG. 15: vacuum-supported tool holder with removed etching cell (first tool) after electrochemical processing of the aluminum surface (circular, dark area within the tool holder);

FIG. 16: electron microscope image of the structured aluminum surface, i.e. after the treatment process, in this case the nanoscale sculpturing process with the system;

FIG. 17: adhered workpiece before removal of the vacuum-assisted tool holder, but after removal of the positioning aid (second tool);

FIG. 18: adhered-on workpiece after removing the positioning aid (second tool) and the vacuum-assisted tool holder;

FIGS. 24-29 copper deposited on aluminum with the help of the fourth tool.

DETAILED DESCRIPTION OF THE INVENTION

At this point it should be pointed out that these figures are only intended to explain the invention but not to limit it. In particular, curved geometrical metallic surfaces are possible, which can be processed accordingly by means of etching tools that are optimized in terms of fluid technology, with geometrically adapted vacuum holders naturally also being used. Furthermore, another four bodies or components that are to be adhered on can be used, which differ significantly from the example shown here. It should be pointed out at this point that the side of the body or component to be adhered on should have a corresponding contour which corresponds to the contour of the metallic surface. It is also possible to form bonds between metals and non-metals, in which case reference is of course made to the corresponding prior art adhesives.

Figure 1:
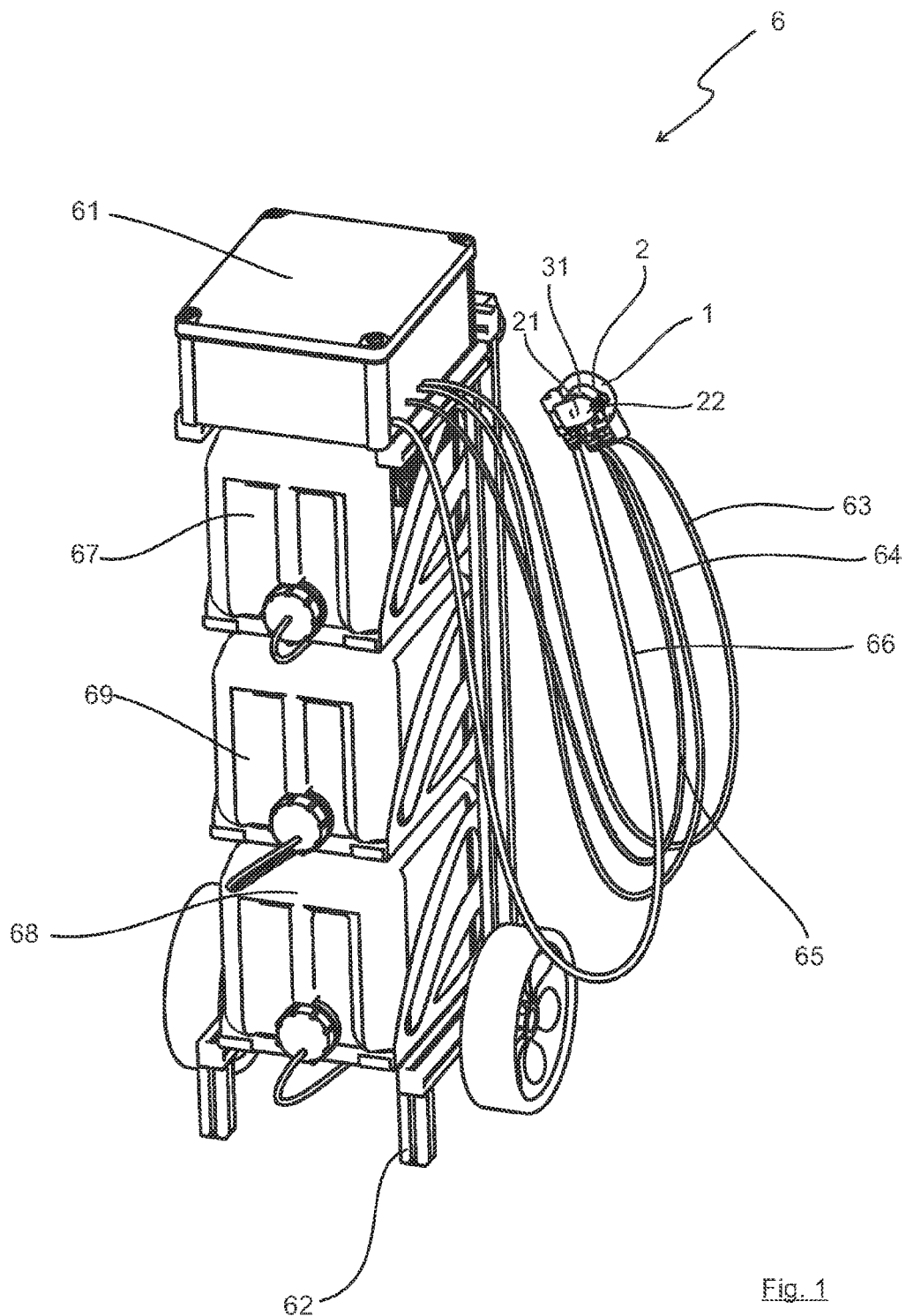
FIG. 1 shows a schematic representation of an exemplary embodiment of a mobile etching system 6.

In FIG. 1 a schematic representation of an embodiment of a mobile etching system 6 is shown.

Here, three storage vessels are initially arranged on a trolley 62, namely an electrolyte tank 67, a collecting container for used electrolyte 68 and a storage tank for a flushing medium 69. Above this is a central box 61 which has a vacuum pump, a control unit, a valve island, electrolyte pump and, if necessary, a flushing pump (all in 61). This control unit and the units arranged in it are connected to the vacuum holder 1 and the electrodes 12, 313 as well as the first tool 31 via hose and cable connections, namely electrolyte supply hose 63, electrolyte drain hose 64, electrolyte power cable electrode 65 and vacuum hose 66, with which the electrolyte is transported out, the used electrolyte is transported back and the corresponding currents are transmitted, which are necessary for the implementation of the electrochemical etching process.

With appropriate valve control within 61, a corresponding flushing medium 69 can be supplied via the electrolyte lines 63, 64 after the etching, with which the structured metallic surface 5 is flushed according to the invention.

FIG. 2 shows a schematic illustration of an exemplary embodiment of the vacuum holder 1 with a first tool 31 not yet inserted.

The vacuum holder 1 has a tool holder 2 in the interior. Corresponding O-rings are provided on the underside of the vacuum holder 1, which seal the vacuum holder 1 on the metallic surface 5, so that a vacuum can be created by means of a vacuum pump 61 via the vacuum connection 11, so that the vacuum holder 1 is suctioned onto the metallic surface 5.

Also associated with the tool holder 2 is a tool securing bracket 21 and a tool securing lock 22, which can be positioned in a correspondingly predetermined manner the case of defined tool dimensions, namely the at least first 31 and second 32 tools.

Also associated with the vacuum holder 1 is a first power connection in the form of an electrode 12, this being able to be placed on the metallic surface 5 as a spring contact on the underside of the vacuum holder 1.

In addition, the first tool 31, namely the etching cell with the electrolyte supply 311 and the drain 312 as well as the power connection for the electrolyte, namely the second electrode 313 and a corresponding sealing ring 314, are shown.

In FIG. 3 is a schematic representation of the embodiment of the vacuum holder 1 with the first tool 31 shown in FIG. 2 inserted, this being only positioned but not yet fixed.

FIG. 4 shows a schematic representation of the embodiment of the vacuum holder 1 shown in FIGS. 2 and 3 with the inserted and fixed first tool 31, the corresponding tool securing bracket 21 interacting with the tool securing lock 22 and securing the first tool 31 in the tool holder 2 in a defined manner.

Figure 5:
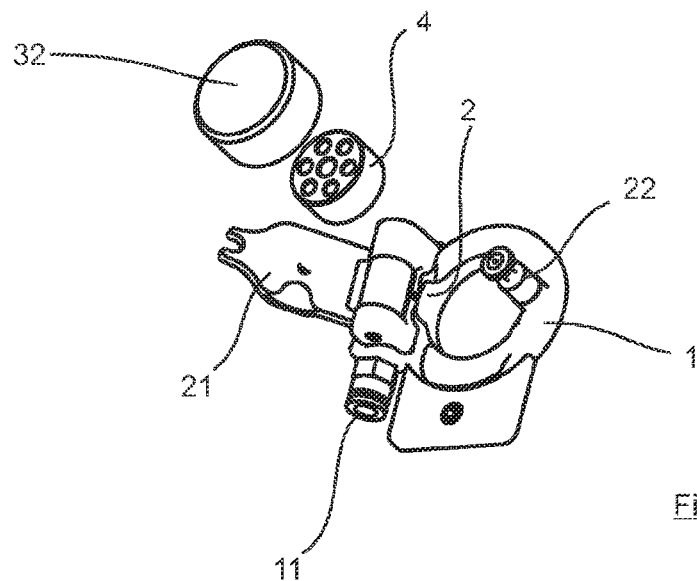
FIG. 5 is a schematic representation of an embodiment of the vacuum holder 1 with a not yet inserted second tool 32 as well as an exemplarily executed body 4 to be adhered.

FIG. 5 shows a schematic representation of an exemplary embodiment of the vacuum holder 1 with a second tool 32 that has not yet been inserted and an exemplary body 4 to be adhered on.

The body 4 to be adhered on has mounting bores, which can be designed, for example, with threads, the body 4 to be adhered being ultimately adhered to the corresponding metallic surface 5 so that corresponding further components can be connected via screw connections.

Figure 6:
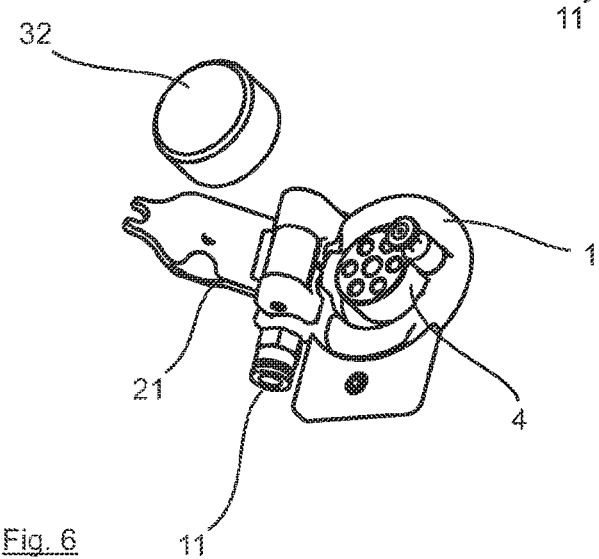
FIG. 6 shows a schematic representation of the exemplary embodiment of the vacuum holder 1 shown in FIG. 5 with the second tool 32 not yet inserted and the exemplarily executed body 4 to be adhered on, this having already been positioned.

FIG. 6 shows a schematic representation of the exemplary embodiment of the vacuum holder 1 shown in FIG. 5 with the second tool 32 not yet inserted and the body 4 to be adhered on as an example, which has already been positioned. First, the adhesive was applied, this being done on the body 4 to be adhered and/or on the structured metallic surface 5, and then the body 4 to be adhered was prepositioned accordingly.

Figure 7:
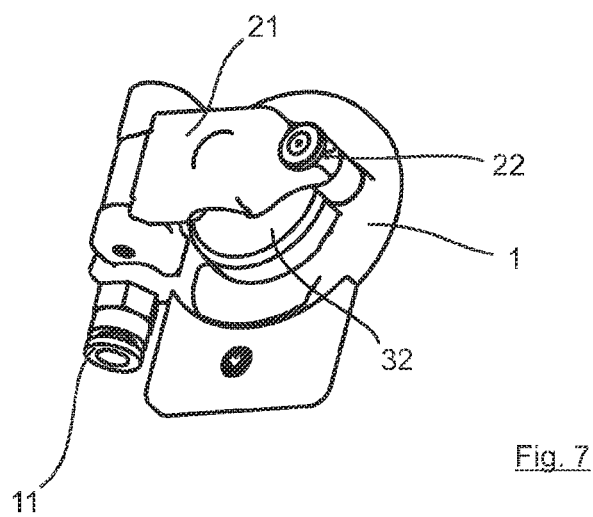

FIG. 7 shows a schematic representation of the exemplary embodiment of the vacuum holder 1 shown in FIGS. 5 and 6 with the inserted and locked second tool 32 and the positioned body 4 designed as an example to be adhered on.

After the pre-positioning of the body 4 to be adhered, the second tool, namely the holding and positioning aid 32, was positioned on the body 4 to be adhered in such a way that the holding and positioning aid 32 is aligned within the tool holder 2, the holding and positioning aid 32 using the tool securing bracket 21 in combination with the tool securing lock 22 is held in such a way that the adhesive is at a defined height, that is to say the body 4 to be adhered is positioned with an adhesive gap. This position is maintained until the adhesive has hardened sufficiently. The entire adhesive and joining device can then be removed and the adhesive can continue to harden.

Figure 8:
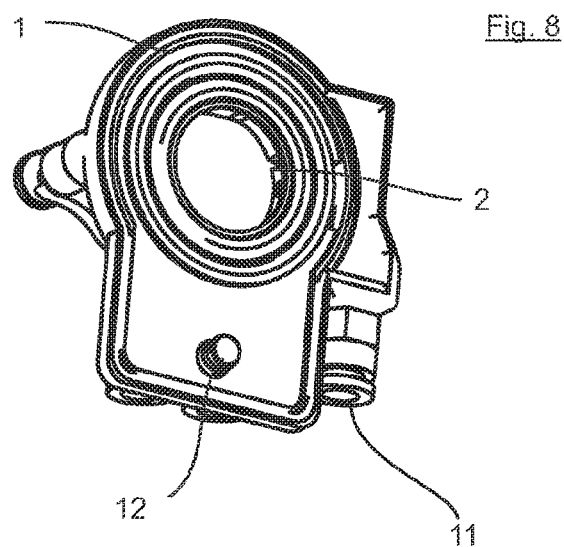
FIG. 8 shows a schematic representation of the vacuum holder 1 according to the invention from the underside, which according to the invention can be placed on the metallic surface 5.

FIG. 8 shows a schematic representation of the vacuum holder 1 according to the invention from the underside, which according to the invention can be placed on the metallic surface 5.

The underside of the vacuum holder 1 can be seen here, and the corresponding associated tool holder 2 can also be seen. In addition, the vacuum connection 11 can also be seen and the first electrode 12 passed through from the top, namely the power connection on the metallic surface 5. On the underside of the vacuum holder 1 the different suction areas can be seen which serve to distribute the corresponding negative pressure/vacuum in terms of area and so to ensure suction of the vacuum holder 1 to the metallic surface 5.

The vacuum holder 1 is limited by two o-rings, which define the surface on which the vacuum acts. The total area to which a vacuum is applied, multiplied by the negative pressure, defines the force with which the vacuum holder 1 is pressed against the metal surface 5. This should be at least a factor of 3 larger than the etched area in order to prevent with sufficient certainty the entire apparatus from lifting off. The diameter and the choice of sealing rings are chosen so that a reliable vacuum seal is created even on slightly structured surfaces. The spring-loaded electrical contact/the first electrode 12 makes contact with the metallic surface 5 to be etched.

Figure 9:
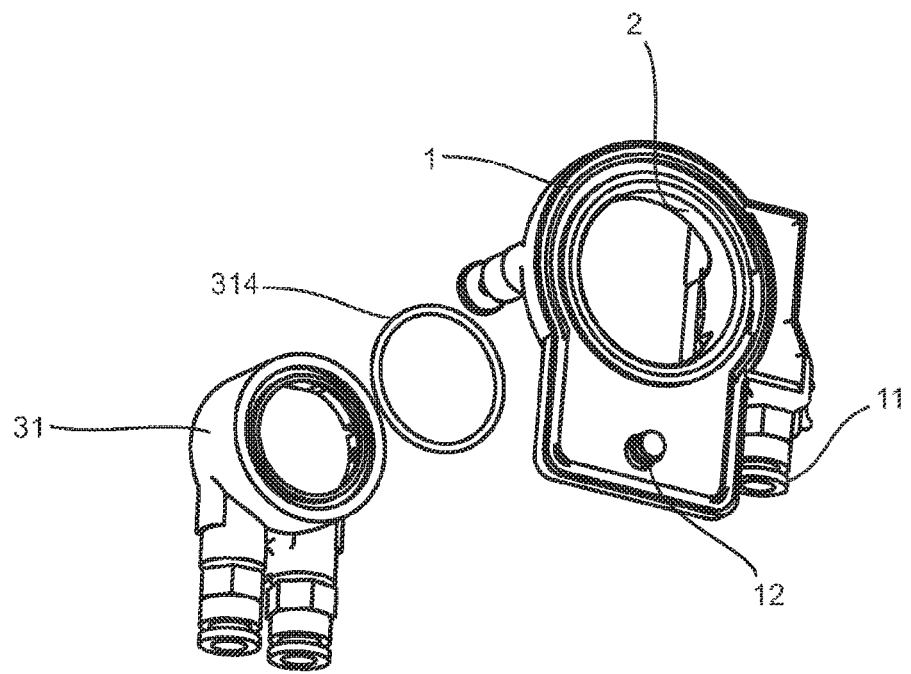
FIG. 9 shows a schematic representation of the vacuum holder 1 according to the invention from the underside, corresponding to FIG. 8, the first tool 31 still being shown here.

In FIG. 9 is a schematic representation of the vacuum holder 1 according to the invention from the underside, corresponding to FIG. 8, wherein the first tool 31 can still be seen here.

The first tool 31 is the etching cell, which is inserted into the tool holder 2, a sealing ring 314 being additionally introduced, this sealing ring 314 ensuring that no electrolyte or rinsing fluid from the etching cell penetrates to the outside and the area is limited.

The structure with inner chambers and channels is optimized for the homogeneous flow around the surface to be etched, the removal of hydrogen bubbles and a turbulent flow in order to avoid points on the surface 5 with reduced static flow. The electrolyte drain is deliberately located on the upper side of the etching cell 31 in order to also carry away the hydrogen bubbles by gravity.

The electrolyte outflow is deliberately located on the upper side of the etching cell 31 in order to also remove the hydrogen bubbles by gravity. The counter electrode 313 was positioned over a large area, parallel and at a sufficient distance from the area to be etched in order to ensure a homogeneous electrical potential distribution on the etched area.

Figure 10:
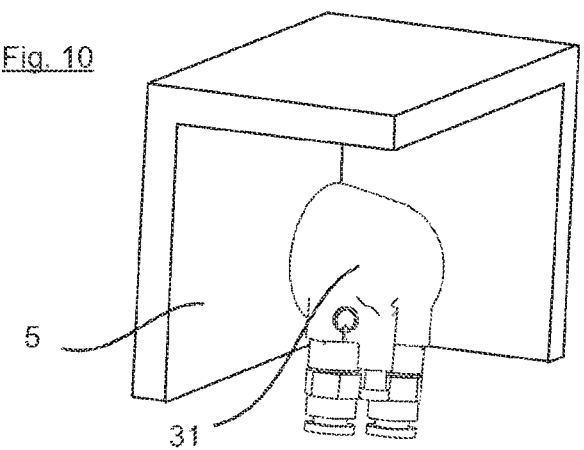
FIG. 10 shows a schematic illustration of a first example of application of the adhesive-joining device on a first metallic surface structure 5, only the first tool 31 being shown for reasons of illustration.

FIG. 10 shows a schematic illustration of a first example of application of the adhesive-joining device on a first metallic surface structure 5, only the first tool 31 being shown for reasons of illustration.

The metallic surface structure 5 is an inner corner to which a corresponding tool is adapted.

At this point, it should be noted that the simplest application is a flat metallic surface. Equally, curved surfaces or areas provided with angles can also be processed accordingly.

Figure 11:
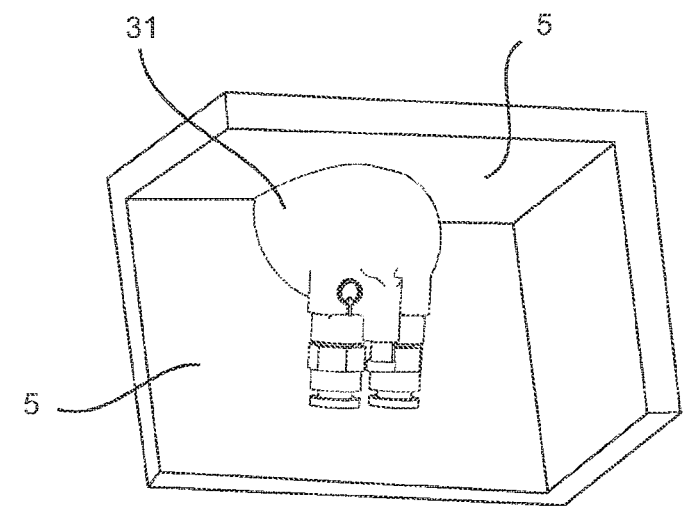
FIG. 11 shows a schematic illustration of a second application example of the adhesive-joining device on a second metallic surface structure 5, only the first tool 31 being shown for reasons of illustration

FIG. 11 is a schematic representation of a second example of application of the adhesive-joining device at a second metallic surface structure 5, wherein only the first tool 31 shown for purposes of illustration.

This is an outer corner of two surface sections that meet one another, onto which ultimately a body 4 to be adhered is adhered.

Figure 12:
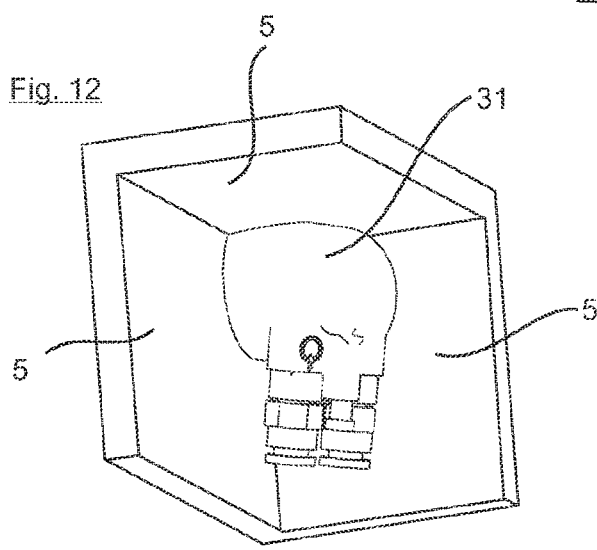
FIG. 12 shows a schematic illustration of a third example of application of the adhesive-joining device on a third metallic surface structure 5, only the first tool 31 being shown for reasons of illustration.
Figure 19:
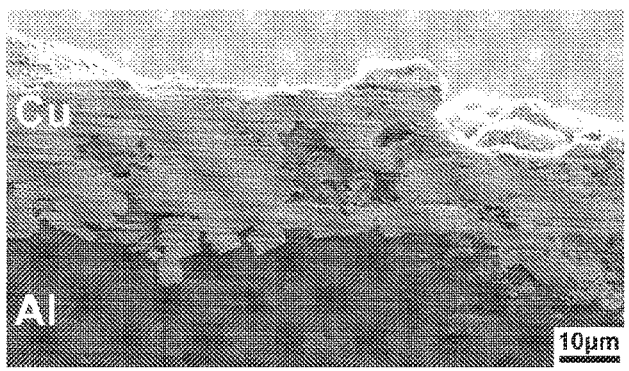
FIGS. 19-23 micrographs showing that, in addition to undercuts, there are also completely enclosed island areas.
Figure 20:
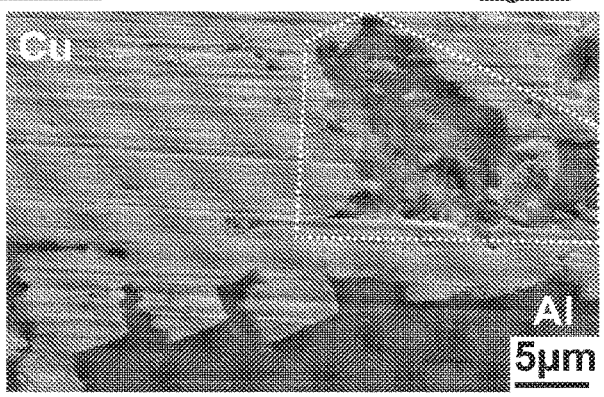
Figure 21:
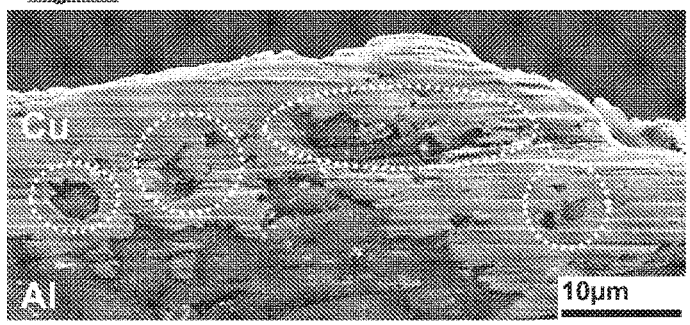
Figure 22:
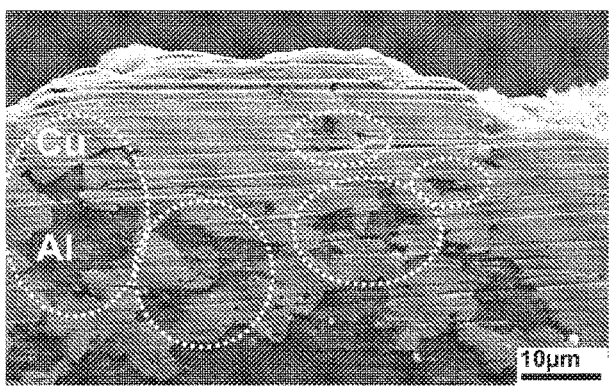
Figure 23:
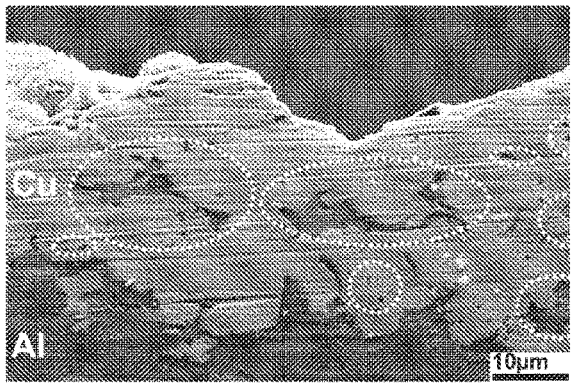
Figure 24:
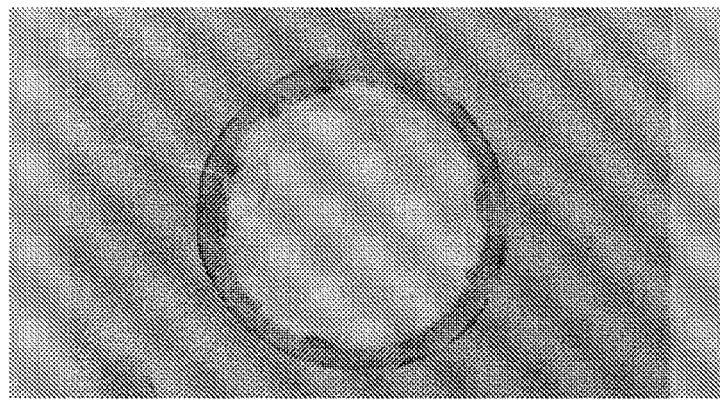
Figure 25:
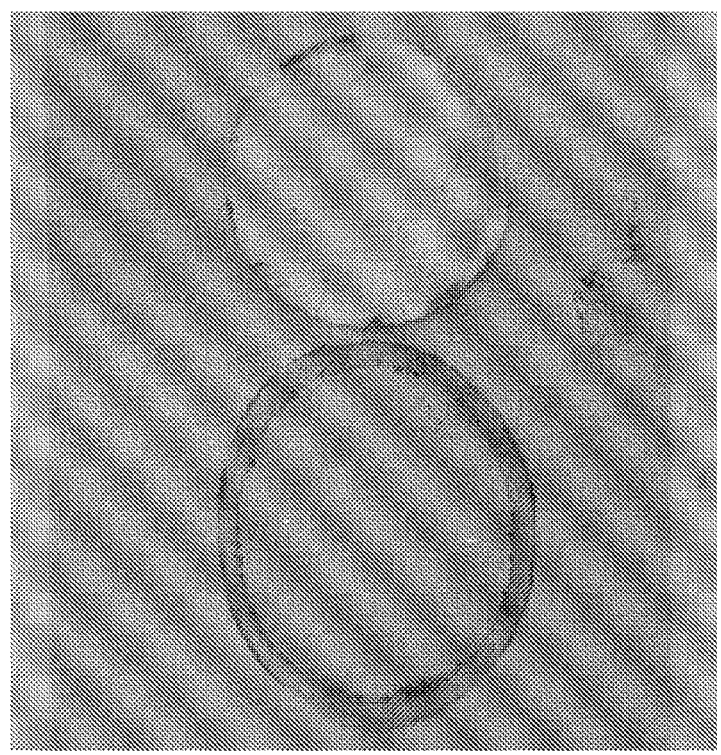

FIG. 12 shows a schematic illustration of a third example of application of the adhesive-joining device on a third metallic surface structure 5, only the first tool 31 being shown for reasons of illustration.

This is an outer corner of three surface sections that meet one another, to which ultimately a body 4 to be adhered is adhered, this already representing a very complex shape and the etching cell, namely the first tool 31, having corresponding internal channels that ensure optimal liquid distribution on the metallic surface 5.

Another Embodiment

The following is a description of the further configuration, namely the possibility of depositing copper on aluminum with the help of the fourth tool (or actually the second tool if this is assumed to be an individual configuration variant) (this is in no way intended to restrict the adhesive joining device and the associated method!), on the basis of an alternative embodiment taking into consideration the figures explained above and the other FIGS. 19 to 29. In one variant, this requires an embodiment in which an etching cell 31 is used again as the first tool, by means of which the metallic surface 5, which in this case is aluminum, is structured accordingly. A second tool 32 is then used to apply copper to the prepared aluminum surface. Corresponding micrographs of this are shown in the following FIGS. 19 to 23, from which it can be seen that, in addition to undercuts, there are also completely enclosed island areas. What applies to adhesives also applies to what would be represented by the copper shown in the figures (according to the adhesive joining device and the method). The quasi further embodiment of the invention would then of course involve a corresponding device for applying a metal, such as copper, to a previously prepared metallic surface, analogous to the invention described above (first tool in combination with the fourth tool).

LIST OF REFERENCE SYMBOLS

1 vacuum holder
11 vacuum connection 12 electric current connection to metallic surface/first electrode
2 tool holder
21 tool securing bracket
22 tool safety lock
31 first tool/etching cell
311 electrolyte supply
312 drain
313 power connection electrolyte/second electrode
314 sealing ring/vacuum ring
32 second tool/holding and positioning aid
4 body/component to be adhered on
5 metallic surface
6 mobile etching machine
61 vacuum pump, control unit, valve terminal, electrolyte pump, flushing pump
62 trolley
63 electrolyte feed hose
64 electrolyte drain hose
65 electrolyte electrode power cable
66 vacuum hose
67 electrolyte tank
68 electrolyte tank (used)
69 flushing medium

The invention claimed is:

1. An adhesive joining device for preparing and/or producing an adhesive connection in an adhesive point and/or adhesive section on a metallic surface (5) to a body and/or component (4) to be adhered thereon and an adhesive by means of an electrochemical etching device, comprising:
    a vacuum holder (1) with a vacuum connection (11) and a seal, wherein the seal is adapted to provide a vacuum seal whereby a vacuum can be formed between the adhesive joining device and the metal surface (5) around the adhesive point and/or adhesive section to be produced, wherein the vacuum holder (1) can be attached to the metal surface (5) and firmly held in place by the vacuum at any positional orientation of the metal surface (5), and wherein the vacuum holder (1) can be removed from the metal surface (5) by ending the vacuum;
    a tool changing holder (2) which receives at least two different tools (31, 32) in a time-offset manner and in a defined position;
    a first tool (31) which can be inserted into the tool holder (2) and used in a time-offset manner, namely an electrochemical etching cell for an electrolyte with
        an etching chamber which is oriented towards the metal surface (5),
        a feed for supplying an electrolyte (311) to the etching chamber,
        a drain for the etching chamber (312), and
        two electrodes (12, 313) with corresponding electric contacts, one electrode (12) being mechanically and electrically connected to the metal surface (5) to be structured and the second electrode (313) coming into contact with the electrolyte; and
    a second tool (32) which can be inserted into the tool holder (2) and used in a time-offset manner for holding and positioning the body and/or component (4) to be adhered to the etched metal surface (5) with a defined position within the tool holder (2), wherein the distance, position, alignment, and/or parallelism of the body (4) to be adhered can be secured and aligned in a defined manner.

2. The adhesive joining device according to claim 1, wherein at least the first tool (31) is flexibly conformable to the metallic surface (5) to be etched with regard to curvature and/or expansion.

3. The adhesive joining device according to claim 1, wherein the first tool (31) which can be inserted and used in the tool holder (2) with a time delay is also adapted for cleaning the etched metallic surface (5), adapted to being provided with corresponding supply and discharge lines for cleaning and/or rinsing liquids and/or rinsing medium (69) and/or the existing supply (311) and the outlet (312) adapted to being switched for a cleaning and/or rinsing liquid and/or rinsing medium (69).

4. The adhesive joining device according to claim 1, wherein a third tool, adapted to being inserted and used with a time offset in the tool holder (2), is provided for cleaning the etched metallic surface (5) after the etching process.

5. The adhesive joining device according to claim 1, wherein a fourth tool, adapted to being inserted and used with a time delay in the tool holder (2), is provided for the local deposition of copper on structured aluminum surfaces in order to produce at least one electrical contacting point.

6. The adhesive joining device according to claim 1, including at least one of
    at least one vacuum pump (61), which is line-connected to the vacuum holder (1) via the vacuum connection (11, 66),
    at least one electrolyte reservoir (67) for storing an electrolyte,
    at least one electrolyte collecting container (68) for receiving the used electrolyte,
    at least one pump (61) for supplying the first tool (31) with an electrolyte
    at least one pump (61) for supplying flushing medium to the first and/or the third tool, and
    at least one control unit (61) for device control and/or process control.

7. The adhesive joining device according to claim 1, wherein the adhesive-joining device is mobile and/or transportable.

8. An adhesive joining method for a metallic surface using the adhesive joining device according to claim 1, comprising the steps:
    selecting the adhesion point, positioning the adhesive joining device and attaching the vacuum holder (1) by creating and maintaining a vacuum;
    simultaneous or subsequent insertion of the first tool (31) into the tool holder (2);
    creation of a structure on the metallic surface (5) at the selected adhesion point and surface by electrochemical etching by means of the first tool (31);
    cleaning and drying the structured metallic surface (5) using the first tool (31) or a third tool, wherein when using the third tool, a tool change takes place;
    removing the tool (31) from the tool holder (2)
    establishing a bond by:
        insertion of the second tool (32) into the tool holder (2) and positioning the body and/or component (4) to be adhered in the second tool (32) and applying the adhesive to the structured metallic surface (5) and/or the body and/or component (4) and subsequent application of the body and/or component (4) to be adhered by means of the second tool (32) for producing a defined gap width, alignment to the structured metallic surface (5) in a fixed position directly above the previously structured metallic surface (5), wherein the tool holder (2) with the vacuum holder (1) remains stationary;

or positioning the body and/or component (4) to be adhered and the adhesive on the structured metallic surface (5) and subsequent insertion of the second tool (32) in the tool holder (2) and using the second tool (32) for producing a defined gap width, alignment to the structured metallic surface (5) in a fixed position directly above the previously structured metallic surface (5), wherein the tool holder (2) with the vacuum holder (1) remains stationary;

hardening or curing and/or allowing the adhesive to harden or cure while the tool holder (2) with the vacuum holder (1) remains stationary; and removing the adhesive joining device.

9. The method according to claim 8, wherein the etching is nanoscale sculpturing.

10. The method according to claim 8, wherein the adhesive is applied using an adhesive application aid and/or the curing of the adhesive takes place under defined conditions, supplying for this purpose a defined amount of thermal energy and/or achieving a defined temperature and/or applying UV lighting.

\* \* \* \* \*